US008837663B2

(12) United States Patent
Koike et al.

(10) Patent No.: US 8,837,663 B2
(45) Date of Patent: *Sep. 16, 2014

(54) RESONANCE CALCULATION PROGRAM AND ANALYZING APPARATUS

(75) Inventors: Hiroki Koike, Tokyo (JP); Kazuya Yamaji, Tokyo (JP); Daisuke Sato, Tokyo (JP); Shinobu Tsubota, Tokyo (JP); Hideki Matsumoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 815 days.

This patent is subject to a terminal disclaimer.

(21) Appl. No.: 12/975,941

(22) Filed: Dec. 22, 2010

(65) Prior Publication Data
US 2012/0057667 A1 Mar. 8, 2012

(30) Foreign Application Priority Data
Sep. 8, 2010 (JP) ................................. 2010-201387

(51) Int. Cl.
*G21C 17/00* (2006.01)
*G21C 17/108* (2006.01)
*G21D 3/00* (2006.01)

(52) U.S. Cl.
CPC .............. *G21D 3/001* (2013.01); *G21C 17/108* (2013.01); *Y02E 30/40* (2013.01)
USPC ....................................................... 376/254

(58) Field of Classification Search
CPC ............................... G21C 17/108; G21C 17/00
USPC ....................................................... 376/254
See application file for complete search history.

(56) References Cited

U.S. PATENT DOCUMENTS

| 6,795,801 | B1 * | 9/2004 | Watkins et al. | .................... 703/6 |
| 7,676,015 | B2 * | 3/2010 | Rahnema et al. | ............. 376/245 |
| 8,401,834 | B2 * | 3/2013 | Van Geemert | .................. 703/18 |
| 8,463,588 | B2 * | 6/2013 | Van Geemert | .................. 703/19 |

FOREIGN PATENT DOCUMENTS

JP 2005-227174 A 8/2005

OTHER PUBLICATIONS

Yamaji, Kazuya et al. "Development of Mitsubishi PWR Nuclear Design Code System (Galaxy/Cosmo-S)," Proceedings of the 2010 Annual Meeting of the Atomic Energy Society of Japan, Mar. 26-28, 2010, G28, p. 311.

* cited by examiner

*Primary Examiner* — Frank J McGue
(74) *Attorney, Agent, or Firm* — Westerman, Hattori, Daniels & Adrian, LLP

(57) ABSTRACT

[Solving Means] A resonance calculation program is configured to calculate an effective cross section including Step S4 of setting a calculation point in the gray range in the resonance region; Step S5 of calculating a neutron flux set at the calculation point and corresponding to a macroscopic cross section based on Method of Characteristics; Step S6 of fitting a fitting equation to the calculated macroscopic cross section and the calculated neutron flux, and calculating first and second rational coefficients; Step S7 of calculating a background cross section based on the first rational coefficient; Step S8 of interpolating the effective cross section, with the background cross section used as an argument; Step S9 of calculating the neutron flux based on the background cross section; and Step S10 of calculating the effective cross section based on the effective cross section, the neutron flux, and the second rational coefficient obtained at the coefficient calculation step.

3 Claims, 5 Drawing Sheets

US 8,837,663 B2

RESONANCE CALCULATION PROGRAM AND ANALYZING APPARATUS

TECHNICAL FIELD

The present invention relates to a resonance calculation program and an analyzing apparatus for calculating an effective cross section that is an input value for neutron transport calculation at a time of calculating a neutron flux of a fuel assembly by the neutron transport calculation.

BACKGROUND ART

There is conventionally known, as a resonance calculation program, a cross section calculation program including a step of calculating a background cross section; and a step of acquiring a resonance integral from a resonance integral table with the background cross section used as an argument, and calculating an effective cross section (effective group constants) based on the acquired resonance integral (see, for example, Patent Literature 1). Calculation equations used in the steps are made up assuming that a fuel rod is a blackness (a black body) absorbing all neutrons. The black body means an object that absorbs all neutrons whereas a white body opposite in meaning to the black body means an object that does not absorb neutrons at all. Furthermore, the calculation equations used at the steps are made up assuming that a fuel cell is a one-dimensional equivalent cylinder.

CITATION LIST

Patent Literature

[PTL 1] JP 2005-227174A

SUMMARY OF INVENTION

Technical Problem

However, if the calculation equations are made up assuming that the fuel rod is the black body, this assumption causes error, because the fuel rod is not a complete blackbody in practice. Moreover, if the calculation equations are made up assuming that the fuel cell is the one-dimensional equivalent cylinder, this assumption causes error, because the fuel cell is of a two-dimensional shape in practice. If an effective cross section is calculated in a state of including these error factors, it is difficult to ensure high calculation precision in the effective cross section by as much as the error factors.

Therefore, an object of the present invention is to provide a resonance calculation program and an analyzing apparatus configured to improve calculation precision in an effective cross section.

Solution to Problem

A computer-readable storage medium storing a resonance calculation program is configured to execute a resonance calculation of calculating an effective cross section serving as an input value for neutron transport calculation on a computer at a time of calculating a neutron flux in a fuel assembly storing a fuel rod. A cross section of the fuel assembly taken along an orthogonal plane orthogonal to an axial direction of the fuel rod is defined as an analysis target region in the resonance calculation, the analysis target region being divided into a plurality of detailed regions, a part of the detailed regions being a resonance region where a resonance phenomenon occurs, a neutron escape probability in the resonance region is expressed by a polynomial rational expression representing a gray range from a black body in which the resonance region absorbs all of neutrons to a white body in which the resonance region does not absorb all of the neutrons at all, the polynomial rational expression including a first rational coefficient and a second rational coefficient. The resonance calculation program uses: a fitting equation for calculating the first rational coefficient and the second rational coefficient, with the first rational coefficient and the second rational coefficient used as factors; a first calculation equation for calculating a background cross section for calculating the effective cross section, with the first rational coefficient used as a factor; a second calculation equation for calculating the neutron flux, with the background cross section used as a factor; and a third calculation equation for calculating the effective cross section, with the second rational coefficient and the neutron flux obtained by the second calculation equation used as factors. The resonance calculation program includes: a calculation point setting step of setting a macroscopic cross section in the gray range, to the resonance region as a calculation point; a first neutron flux calculation step of calculating the neutron flux set at the calculation point and corresponding to the macroscopic cross section based on Method of Characteristics; a coefficient calculation step of fitting the fitting equation to the macroscopic cross section and the neutron flux so as to provide a function representing the macroscopic cross section and the neutron flux at the calculation point, and calculating the first rational coefficient and the second rational coefficient; a background cross section calculation step of assigning the calculated first rational coefficient to the first calculation expression, and calculating the background cross section; an effective cross section interpolation step of interpolating the effective cross section from a cross section storage unit storing the effective cross section made to correspond to the background cross section, with the calculated background cross section used as an argument; a second neutron flux calculation step of assigning the background cross section to the second calculation equation, and calculating the neutron flux; and an effective cross section calculation step of assigning the effective cross section obtained at the effective cross section interpolation step, the neutron flux obtained at the second neutron flux calculation step, and the second rational coefficient obtained at the coefficient calculation step to the third calculation equation, and calculating the effective cross section.

With this constitution, the resonance region can be dealt with in the gray range from the black body to the white body. Further, the analysis target region can be strictly dealt with in a heterogeneous state by calculating the analysis target region based on the Method of Characteristics. This can reduce error factors and, therefore, improve the calculation precision in the effective cross section.

Advantageously, in the computer-readable storage medium storing the resonance calculation program, a neutron escape probability in the resonance region is expressed by following calculation equation (1):

[Equation 1]

$$P_{f \to m}(E) = \sum_{n=1}^{N} \beta_n \frac{\alpha_n}{\sum_{t} (E) l_f + \alpha_n} \quad (1)$$

$P_{f \to m}(E)$ ... Neutron escape probability
$E$ ... Neutron energy

N . . . Number of term
$\alpha_n$ . . . First rational coefficient
$\beta_n$ . . . Second rational coefficient
$\Sigma_t^f$ . . . Macroscopic total cross section in a resonance region f
$l_f$ . . . Average chord length in the resonance region f;
the fitting equation is expressed by following calculation equation (2):

[Equation 2]

$$\phi_f(\sum_t^f) = \sum_{n=1}^{N-1} \beta_n \frac{\sum_p^f l_f + \alpha_n}{\sum_t^f l_f + \alpha_n} + \left(1 - \sum_{n=1}^{N-1} \beta_n\right) \cdot \frac{\sum_p^f l_f + \alpha_n}{\sum_t^f l_f + \alpha_n} \quad (2)$$

$\phi_f$ Neutron flux in the resonance region f
$\Sigma_p^f$ Macroscopic potential scattering cross section in the resonance region f;
the first calculation equation is expressed by following calculation equation (3):

[Equation 3]

$$\sigma_0^{nr} = \frac{\sum_{k \neq r} \lambda_k N_k^f \sigma_p^k + \alpha_n / l_f}{N_r^f} \quad (3)$$

$\sigma_0^{nr}$ . . . Background cross section of a resonance nuclide r at an n-th term
$\lambda_k$ . . . IR parameter of the nuclide k
$N_k^f$ . . . Atomic number density of a nuclide k in the resonance region f
$N_r^f$ . . . Atomic number density of the resonance nuclide r in the resonance region f
$\sigma_p^k$ . . . Microscopic potential scattering cross section of the nuclide k;
the second calculation equation is expressed by following calculation equation (4):

[Equation 4]

$$\varphi_g^r(\sigma_0^{nr}) = \frac{\sigma_p^r + \sigma_0^{nr}}{\sigma_{a,g}^r(\sigma_0^{nr}) + \sigma_p^r + \sigma_0^{nr}} \quad (4)$$

$\phi_g^r$ . . . Neutron flux of the resonance nuclide r in a group g
$\sigma_p^r$ . . . Microscopic potential scattering cross section of the resonance nuclide r
$\sigma_{a,g}^r$ . . . Microscopic absorption cross section of the resonance nuclide r in the group g; and
the third calculation equation is expressed by following calculation equation (5):

[Equation 5]

$$\sigma_{x,g}^{r,f} = \frac{\sum_{n=1}^{N} \beta_n \sigma_{x,p}^r(\sigma_0^{nr}) \varphi_g^r(\sigma_0^{nr})}{\sum_{n=1}^{N} \beta_n \varphi_g^r(\sigma_0^{nr})} \quad (5)$$

$\sigma_{x,g}^r$ . . . Effective microscopic cross section of the resonance nuclide r in the group g for reaction x
$\sigma_{x,g}^{r,f}$ . . . Effective microscopic cross section of the resonance nuclide r in the group g for the reaction x in the resonance region f.

With this constitution, the effective cross section can be calculated with high precision by using various calculation equations.

Advantageously, in the computer-readable storage medium storing the resonance calculation program, at the calculation point setting step, number of calculation points is set to equal to or greater than 2N−1.

With this constitution, the various calculation equations include 2N−1 unknown coefficients. Therefore, the first and second rational coefficients can be precisely calculated by setting the number of calculation points to be equal to or larger than 2N−1.

According to another aspect of the present invention, an analyzing apparatus is configured to read and execute the resonance calculation program stored in the computer-readable storage medium storing the resonance calculation program.

With this constitution, the calculation precision in the effective cross section can be improved by using the resonance calculation program.

Advantageous Effects of Invention

The resonance calculation program and the analyzing apparatus according to the present invention can deal with the resonance region in the gray range from the black body to the white body, and strictly deal with the analysis target region in a heterogeneous state. Due to this, it is possible to reduce error factors and improve the calculation precision in the effective cross section.

DESCRIPTION OF EMBODIMENTS

Exemplary embodiments of a resonance calculation program and an analyzing apparatus according to the present invention will be explained below in detail with reference to the accompanying drawings. The present invention is not limited to the embodiments. In addition, constituent elements in the following embodiments include those that can be replaced by persons skilled in the art or that are substantially equivalent.

Embodiments

A resonance calculation program according to an embodiment of the present invention is incorporated in a reactor core analysis program for evaluating fuel assemblies in a reactor core. The reactor core analysis program can be executed on a computer. By calculating a neutron flux in the reactor core, the reactor core analysis program predicts and evaluates a distribution and behaviors of neutrons acting as an intermediary of a nuclear reaction in the reactor core. Further, a reactor core is designed based on an analysis result obtained by this reactor core analysis program. The reactor core design is made to replace fuel loaded in the reactor core in light of safety, burn-up efficiency, fuel arrangement and the like.

Figure 1:
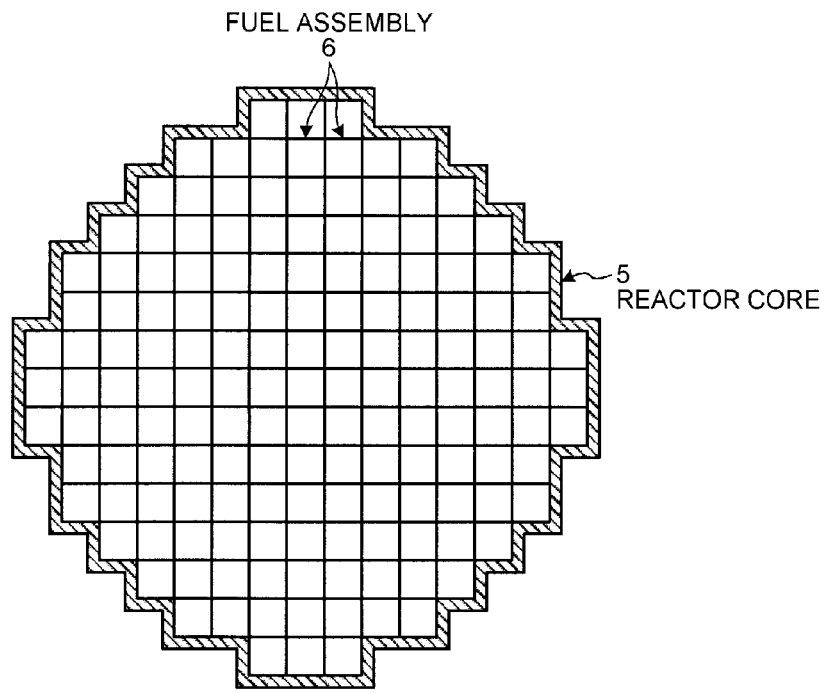
FIG. 1 is a structure diagram for schematically depicting a reactor core serving as an analysis target region of an analyzing apparatus configured to execute a resonance calculation program according to an embodiment of the present invention.
Figure 2:
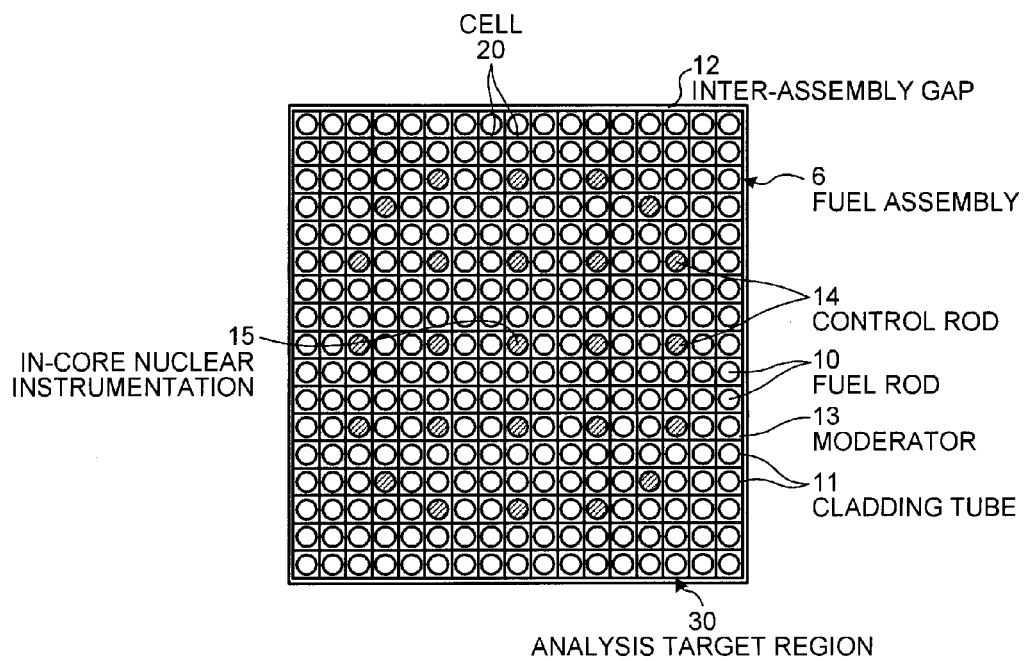
FIG. 2 is a cross-sectional view of a fuel assembly serving as an analysis target region, taken along a plane orthogonal to an axial direction of the fuel assembly.
Figure 3:
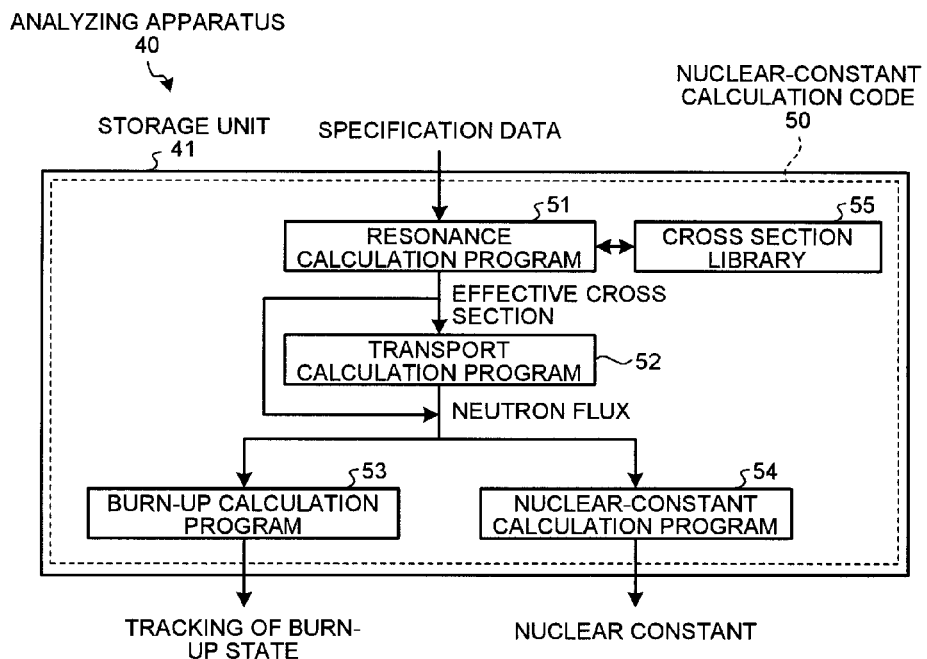
FIG. 3 is an explanatory diagram for schematically depicting nuclear-constant calculation codes.
Figure 4:
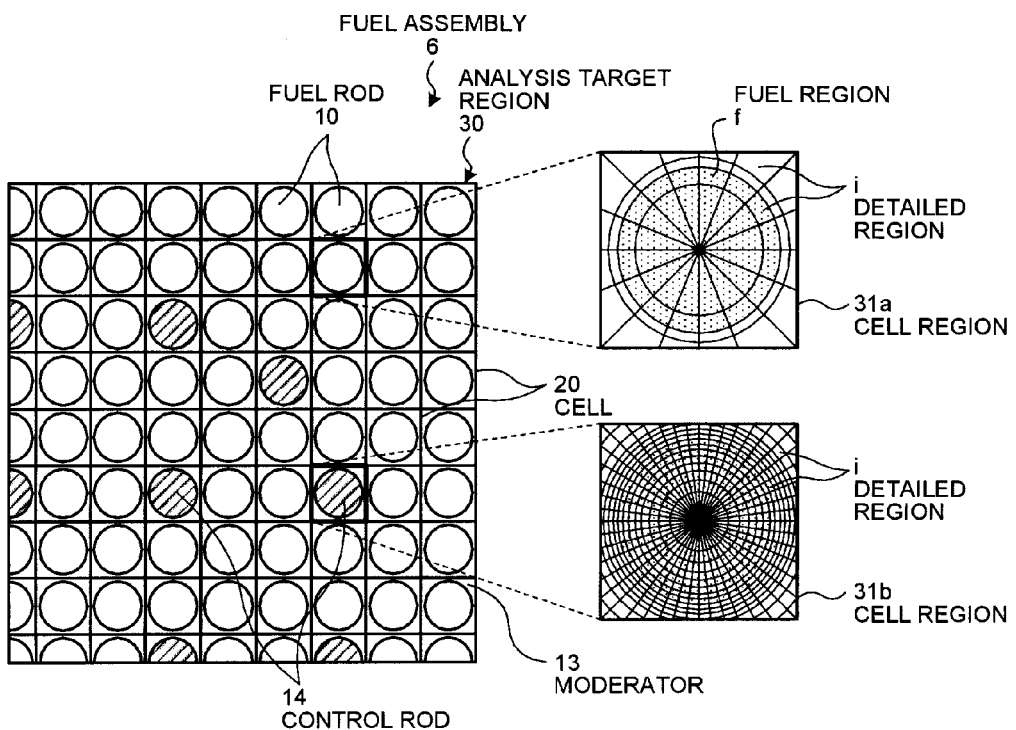
FIG. 4 is an explanatory diagram for depicting an analysis target region divided into a plurality of detailed regions.
Figure 5:
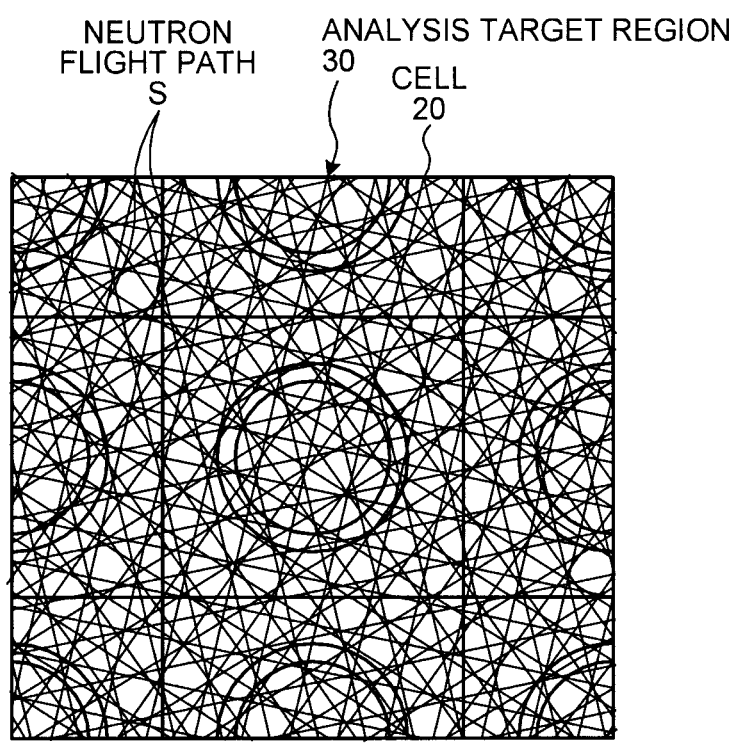
FIG. 5 is an explanatory diagram for depicting an analysis target region on which neutron flight paths are drawn.

FIG. 1 is a structure diagram for schematically depicting a reactor core serving as an analysis target region of the resonance calculation program according to the present embodiment. FIG. 2 is a cross-sectional view of one fuel assembly serving as the analysis target region, taken along a plane orthogonal to an axial direction of the fuel assembly. FIG. 3 is an explanatory diagram for schematically depicting nuclear-constant calculation codes. FIG. 4 is an explanatory diagram for depicting the analysis target region divided into a plurality of detailed regions. FIG. 5 is an explanatory diagram for depicting the analysis target region on which neutron flight paths are drawn.

As shown in FIG. 1, a reactor core 5 serving as a target of the reactor core design is stored in a nuclear reactor. The reactor core 5 is configured to include a plurality of fuel assemblies 6, and the plural fuel assemblies 6 are arranged geometrically to keep 90-degree symmetry. Note that fuel replacement is made in units of six fuel assemblies.

As shown in FIG. 2, each of the fuel assemblies 6 is configured to include a plurality of fuel rods 10, a plurality of cladding tubes 11 covering up the fuel rods 10, respectively, and a grid (not shown) binding up the plural cladding tubes 11. An interior of the fuel assembly 6 is filled with a moderator (coolant) 13 and configured so that a plurality of control rods 14 and an in-core nuclear instrumentation 15 can be inserted into the fuel assembly 6.

The fuel assembly 6 is formed into a square in cross section and constituted by, for example, 17×17 cells 20. Among the 17×17 cells 20, the control rods 14 are inserted into the cells 20, respectively, and an in-core nuclear instrumentation 15 is inserted into the cell 20 at the center of the assembly. At this time, the cells 20 into which the respective control rods 14 are inserted are referred to as "control rod guide tubes" and the cell 20 into which the in-core nuclear instrumentation 15 is inserted is referred to as "instrumentation guide tube". Furthermore, the fuel rods 10 are inserted into the other cells 20, respectively. If the fuel assemblies 6 are employed in a boiling water reactor (BWR), an exterior of each of the fuel assemblies 6 is covered with a channel box. If the fuel assemblies 6 are employed in a pressurized water reactor (PWR), the exterior of each of the fuel assemblies 6 is open. Further, an inter-assembly gap 12 is present outside of the channel box in a case of the BWR and outside of each of the fuel assemblies 6 in a case of the PWR.

The reactor core analysis program is described next. The reactor core analysis program is a program that can be executed on an analyzing apparatus (a computer) 40 and that is stored in a storage unit 41 of the analyzing apparatus 40. This reactor core analysis program includes a nuclear-constant calculation code 50 (see FIG. 3) calculating nuclear constants of the fuel assemblies 6 loaded in the reactor core 5, and a reactor core calculation code calculating nuclear characteristics in the reactor core 5 based on the calculated nuclear constants.

The nuclear-constant calculation code 50 defines a quadrilateral geometry that is a cross section obtained by taking each of the fuel assemblies 6 along a plane orthogonal to an axial direction as a two-dimensional analysis target region 30 (see FIG. 2). In addition, the nuclear-constant calculation code 50 is a code that can calculate nuclear constants in the analysis target region 30. Note that the nuclear constants are input data used in reactor core calculation and include a diffusion constant, an absorption cross section, a removal cross section, a generation cross section and the like. The nuclear constants that are input data for the reactor core calculation are generated by calculating the nuclear constants using the nuclear-constant calculation code.

The reactor core calculation code makes reactor core calculation by setting the calculated nuclear constants to nuclear nodes (not shown), respectively, each of which nodes is a small volume of a rectangular shape obtained by dividing each of the fuel assemblies 6 into a plurality of segments. The plural fuel nodes express the reactor core, and the reactor core calculation code serves as a code that can evaluate the nuclear characteristics of the interior of the reactor core such as a critical boron concentration, a power distribution, and reactivity coefficients by making the reactor core calculation.

If the reactor core analysis program mentioned above is executed on the analyzing apparatus 40, then the analyzing apparatus 40 calculates the nuclear constants in the analysis target region 30 of the fuel assembly 6 using the nuclear-constant calculation code 50, and makes the reactor core calculation by setting the calculated nuclear constants to the respective fuel nodes using the reactor core calculation code, thereby evaluating the nuclear characteristics of the reactor core 5.

The nuclear-constant calculation code 50 is described next specifically with reference to FIG. 3. The nuclear-constant calculation code 50 of the present embodiment is a two-dimensional transport calculation code corresponding to a heterogeneous system of the fuel assembly 6. The nuclear-constant calculation code 50 calculates such things as a neutron flux, burn-up, and the nuclear constants in the fuel assembly using a neutron transport equation according to Method of Characteristics (MOC).

The nuclear-constant calculation code 50 is configured to include a resonance calculation program 51, a transport calculation program 52, a burn-up calculation program 53, and a nuclear-constant calculation program 54, and is executed on the analyzing apparatus 40. Furthermore, the nuclear-constant calculation code 50 makes various calculations based on specification data input to the analyzing apparatus 40 and relating to the fuel assemblies 6 and on an effective cross section, to be described later, acquired from a cross section library (cross section storage unit) 55 stored in the storage unit 41 of the analyzing apparatus 40. Examples of the specification data include a radius of one fuel rod, an inter-assembly gap, a fuel constitution, a fuel temperature, and a moderator temperature.

As shown in FIG. 4, the analysis target region 30 that is the analysis target of the nuclear-constant calculation code 50 is an arbitrarily set system and configured to include a plurality of cell regions 31a and 31b corresponding to the respective cells 20. Examples of the cell regions 31a and 31b include the cell region 31a into which one fuel rod 10 is inserted and the cell region 31b into which one control rod 14 is inserted. Each of the cell regions 31a and 31b is divided into a plurality of detailed regions i. Part of these plural detailed regions are resonance regions where a resonance phenomenon occurs. A case where the resonance regions are fuel regions f assuming that the detailed regions i related to the fuel rods 10 are the fuel regions f is described below.

The resonance calculation program 51 is executed so as to calculate an effective cross section of each of the detailed regions i in light of the resonance phenomenon. Here, the resonance phenomenon means a phenomenon that a cross section increases dramatically if neutron energy is equal to predetermined energy. The resonance calculation program 51 divides the neutron energy into a plurality of energy groups and obtains the effective cross section that is an average cross section of the divided energy groups. That is, the resonance calculation program 51 calculates the effective cross section in multiple groups.

As described later in detail, the resonance calculation program 51 calculates the effective cross section (the effective microscopic cross section in the present embodiment) that is the input data to the transport calculation program based on the input specification data. The resonance calculation program 51 calculates this effective microscopic cross section based on a background cross section. That is, the resonance calculation program 51 calculates the background cross section based on the input specification data and calculates the effective microscopic cross section based on the calculated background cross section.

The cross section library 55 stores a table that makes the background cross section correspond to the effective microscopic cross section and is provided for every nuclide. Due to this, if having calculated the background cross section, the resonance calculation program 51 calculates the effective microscopic cross section from the cross section library with the calculated background cross section used as an argument.

The transport calculation program 52 calculates neutron fluxes of the respective detailed regions i in each of the fuel assemblies 6 over multiple groups based on the MOC. The transport calculation program 52 is briefly described below. As shown in FIG. 5, the transport calculation program 52 creates a plurality of neutron flight paths S on the analysis target region 30 divided into a plurality of detailed regions i. The transport calculation program 52 solves a neutron transport equation and calculates the neutron flux in each of the detailed regions i for each of the created neutron flight paths S. In this case, the neutron transport equation for a group g on one-dimensional coordinates along a vector direction of each of the neutron flight paths S is expressed by the following Equation (6).

[Equation 6]

$$\frac{d\psi^g(s)}{ds} + \sum_{t}^{g} \psi^g(s) = \overline{Q}^g \tag{6}$$

$\psi^g$ ... Neutron flux in group g.
$\Sigma_t^g$ ... Macroscopic total cross section in group g.
$\overline{Q}^g$ ... Neutron source in group g.

The macroscopic total cross section $\tau_{t,g}$ used in the Equation (6) is calculated based on the effective microscopic cross section calculated by the resonance calculation program 51.

The burn-up calculation program 53 executes a burn-up calculation for tracking generation and extinction of nuclides in the reactor core 5. The burn-up calculation program 53 evaluates a time variation of an atomic number density of each nuclide by solving the burn-up equation, and gives input conditions of multiple-group neutron transport calculation for each burn-up point. As a result, the burn-up calculation program 53 tracks a burn-up state (time variation in burn-up) by alternately making the burn-up calculation and the transport calculation for every predetermined sampling cycle.

The nuclear-constant calculation program 54 collapses and homogenizes the effective macroscopic cross sections of the multiple groups in the fuel assembly 6 and calculates homogenized macroscopic nuclear constants with the neutron fluxes of the multiple groups in the fuel assembly 6 obtained by the transport calculation program 52 used as a weight.

The resonance calculation program 51 according to the present embodiment is described below in detail. This resonance calculation program makes the resonance calculation based on the equivalence principle. In the resonance calculation based on the equivalence principle, the resonance calculation program 51 calculates the background cross section corresponding to the heterogeneous system, and acquires the effective cross section for the heterogeneous system from the table expressed by the following Equation (7) with the calculated background cross section used as an argument. Note that the table expressed by the Equation (7) is stored in the cross section library 55.

[Equation 7]

$$\sigma_{x,g}^r = f(\sigma_0^r) \tag{7}$$

$\sigma_{x,g}^r$ ... Cross section of the group g for reaction x and resonance nuclide r.
$\sigma_0^r$ ... Background cross section of resonance nuclide r.

A calculation equation used in the resonance calculation program 51 is described next. The neutron flux in each of the fuel regions f is expressed by the following Equation (8).

[Equation 8]

$$\phi_f(E) = \frac{1}{E}\left[\{1 - P_{f \to m}(E)\}\frac{\sum_{p}^{f}}{\sum_{t}^{f}(E)} + P_{f \to m}(E)\right] \tag{8}$$

E ... Neutron energy
$\phi_f$ ... Neutron flux in the resonance region f
$P_{f \to m}(E)$ ... Neutron escape probability
$\Sigma_p^f$ ... Macroscopic potential scattering cross section in the resonance region f
$\Sigma_t^f$ ... Macroscopic total cross section in the resonance region f At this time, $P_{f \to m}(E)$, that is, the neutron escape probability is expressed by the following Equation (9) that represents a gray range from a black body the fuel regions f of which absorb all neutrons to a white body the fuel regions f of which do not absorb all neutrons, and that is a polynomial rational expression including a first rational coefficient $\alpha_n$ and a second rational coefficient $\beta_n$.

[Equation 9]

$$P_{f \to m}(E) = \sum_{n=1}^{N} \beta_n \frac{\alpha_n}{\sum_{t}^{f}(E)l_f + \alpha_n} \tag{9}$$

$\alpha_n$ ... First rational coefficient
$\beta_n$ ... Second rational coefficient
$l_f$ ... Average chord length in the resonance region f In the Equation (9), $l_f$ is given by $4V_f/S_f$, $S_f$ denotes a surface area of the fuel region, and $V_f$ denotes a volume of the fuel region. These are given as the specification data. The following Equation (10) is deduced by assigning the Equation (9) to the Equation (8).

[Equation 10]

$$\phi_f(E) = \frac{1}{E} \sum_{n=1}^{N} \beta_n \frac{\sum_{p}^{f} l_f + \alpha_n}{\sum_{t}^{f}(E) l_f + \alpha_n} \cong \frac{1}{E} \sum_{n=1}^{N} \beta_n \frac{\sigma_p^r + \sigma_0^{nr}}{\sigma_t^r(E) + \sigma_0^{nr}} \quad (10)$$

$\sigma_p^r$ ... Microscopic potential scattering cross section of the resonance nuclide r $\sigma_t^r$ ... Microscopic total cross section of the resonance nuclide r $\sigma_0^{nr}$ ... Background cross section of the resonance nuclide r on the n-th term.

Note that the left-hand side of the Equation (10) can be transformed to the right-hand side of the Equation (10) by ignoring absorption reaction of nuclides k other than the resonance nuclide r included in the fuel region f and resonance scattering. At this time, the background cross section is expressed by the following Equation (11).

[Equation 11]

$$\sigma_0^{nr} = \frac{\sum_{k \neq r} \lambda_k N_k^f \sigma_p^k + \alpha_n / l_f}{N_r^f} \quad (11)$$

$\lambda_k$ ... IR parameter of nuclides k $N_k^f$ ... Atomic number density of nuclides k in resonance region f $N_r^f$ ... Atomic number density of resonance nuclide r in resonance region f $\sigma_p^k$ ... Microscopic potential scattering cross section of nuclides k Next, a resonance integral for the nuclide r, the reaction x, and the group g is defined by the following Equation (12).

[Equation 12]

$$I_{x,g}^r(\sigma_0^{nr}) \equiv \frac{\int_{E_g}^{E_{g-1}} dE \sigma_x^r(E) \phi_f(E, \sigma_0^{nr})}{\int_{E_g}^{E_{g-1}} dE \frac{1}{E}} \quad (12)$$

E ... Neutron energy

Eg ... Lower boundary of neutron energy for group g

Eg-1 ... Upper boundary of neutron energy for group g $I_{x,g}^r$ ... Resonance integral for group g, reaction x, and resonance nuclide r $\sigma_x^r$ ... Microscopic cross section of resonance nuclide r for reaction x Moreover, the effective microscopic cross section of the nuclide r for the reaction x of the group g in the fuel region f is expressed by the following Equation (13). A right-hand side of the Equation (13) is calculated by assigning the Equations (10) and (12) to a center side of the Equation (13).

[Equation 13]

$$\sigma_{x,g}^{r,f} = \frac{\int_{E_g}^{E_{g-1}} dE \sigma_x^r(E) \phi_f(E)}{\int_{E_g}^{E_{g-1}} dE \phi_f(E)} = \frac{\sum_{n=1}^{N} \beta_n I_{x,g}^r(\sigma_0^{nr})}{1 - \sum_{n=1}^{N} \beta_n \frac{I_{a,g}^r(\sigma_0^{nr})}{\sigma_p^r + \sigma_0^{nr}}} \quad (13)$$

$\sigma_{x,g}^{r,f}$ ... Effective microscopic cross section of group g in resonance region f for nuclide r and reaction x $I_{a,g}^r$ ... Resonance integral for group g, absorption reaction a, and resonance nuclide r If N is set to 1 (N=1) in the Equation (13), the following Equations (14) and (15) that are relational expressions between the effective microscopic cross section and the resonance integral for the reaction x and an absorption reaction a (x=a) are obtained.

[Equation 14]

$$\sigma_{x,g}^r(\sigma_0^r) = \frac{I_{x,g}^r(\sigma_0^r)}{1 - \frac{I_{a,g}^r(\sigma_0^r)}{\sigma_p^r + \sigma_0^r}} \quad (14)$$

[Equation 15]

$$\sigma_{a,g}^r(\sigma_0^r) = \frac{I_{a,g}^r(\sigma_0^r)}{1 - \frac{I_{a,g}^r(\sigma_0^r)}{\sigma_p^r + \sigma_0^r}} \quad (15)$$

By simultaneously solving these Equations (14) and (15), the following Equations (16) and (17) are obtained.

[Equation 16]

$$I_{x,g}^r(\sigma_0^r) = \sigma_{x,g}^r(\sigma_0^r) \varphi_g^r(\sigma_0^r) \quad (16)$$

[Equation 17]

$$\varphi_g^r(\sigma_0^{nr}) = \frac{\sigma_p^r + \sigma_0^{nr}}{\sigma_{a,g}^r(\sigma_0^{nr}) + \sigma_p^r + \sigma_0^{nr}} \quad (17)$$

$\phi_g^r$ ... Neutron flux of resonance nuclide r in group g

By assigning the Equations (16) and (17) to the Equation (13), the Equation (18) representing the effective microscopic cross section based on the equivalence principle can be deduced.

[Equation 18]

$$\sigma_{x,g}^{r,f} = \frac{\sum_{n=1}^{N} \beta_n \sigma_{x,g}^r(\sigma_0^{nr}) \varphi_g^r(\sigma_0^{nr})}{\sum_{n=1}^{N} \beta_n \varphi_g^r(\sigma_0^{nr})} \quad (18)$$

Calculation equations for calculating the first rational coefficient $\alpha_n$ and the second rational coefficient $\beta_n$ are described next. The neutron flux at an arbitrary energy point in the Equation (10) can be regarded as a function of the macroscopic total cross section of the fuel region f and expressed by the following Equation (19).

[Equation 19]

$$\sigma_f(\Sigma_t^f) = \sum_{n=1}^{N} \beta_n \frac{\Sigma_p^f l_f + \alpha_n}{\Sigma_t^f l_f + \alpha_n} \quad (19)$$

$$= \sum_{n=1}^{N-1} \beta_n \frac{\Sigma_p^f l_f + \alpha_n}{\Sigma_t^f l_f + \alpha_n} + \left(1 - \sum_{n=1}^{N-1} \beta_n\right) \cdot \frac{\Sigma_p^f l_f + \alpha_N}{\Sigma_t^f l_f + \alpha_N}$$

As can be understood from the Equation (19), the Equation (19) is made up for the neutron flux. Due to this, the rational coefficients $\alpha_n$ and $\beta_n$ can be obtained by solving the neutron flux based on the MOC. In the present embodiment, the following Equation (20) is given as a fitting equation so as to calculate the rational coefficients $\alpha_n$ and $\beta_n$ using a macroscopic total reaction rate $R_{t,f}$ because the macroscopic total reaction rate $R_{t,f}$ is evaluated.

[Equation 20]

$$R_t^f(\Sigma_t^f) = \Sigma_t^f \phi_f(\Sigma_t^f) \quad (20)$$

$$= \Sigma_t^f \sum_{n=1}^{N-1} \beta_n \frac{\Sigma_p^f l_f + \alpha_n}{\Sigma_t^f l_f + \alpha_n} + \Sigma_t^f \left(1 - \sum_{n=1}^{N-1} \beta_n\right) \cdot \frac{\Sigma_p^f l_f + \alpha_N}{\Sigma_t^f l_f + \alpha_N}$$

Therefore, in the present embodiment, the rational coefficients $\alpha_n$ and $\beta_n$ are calculated using the Equation (20). Alternatively, the rational coefficients $\alpha_n$ and $\beta_n$ can be calculated using the Equation (20). To calculate the rational coefficients $\alpha_n$ and $\beta_n$ using the Equation (20), a neutron flux $\phi_f$ is calculated independently by one-group fixed-source calculation based on the MOC for an arbitrary macroscopic total cross section $\Sigma_{t,f}$ including the gray range from the white body to the black body in the fuel region f, and pairs of $(\Sigma_{t,f}, \phi_f)$ are created. Because (2N−1) unknown coefficients are present, (2N−1) or more pairs of $(\Sigma_{t,f}, \phi_f)$ are created. By fitting the Equation (20) based on the method of least squares, the rational coefficients $\alpha_n$ and $\beta_n$ are calculated.

Figure 6:
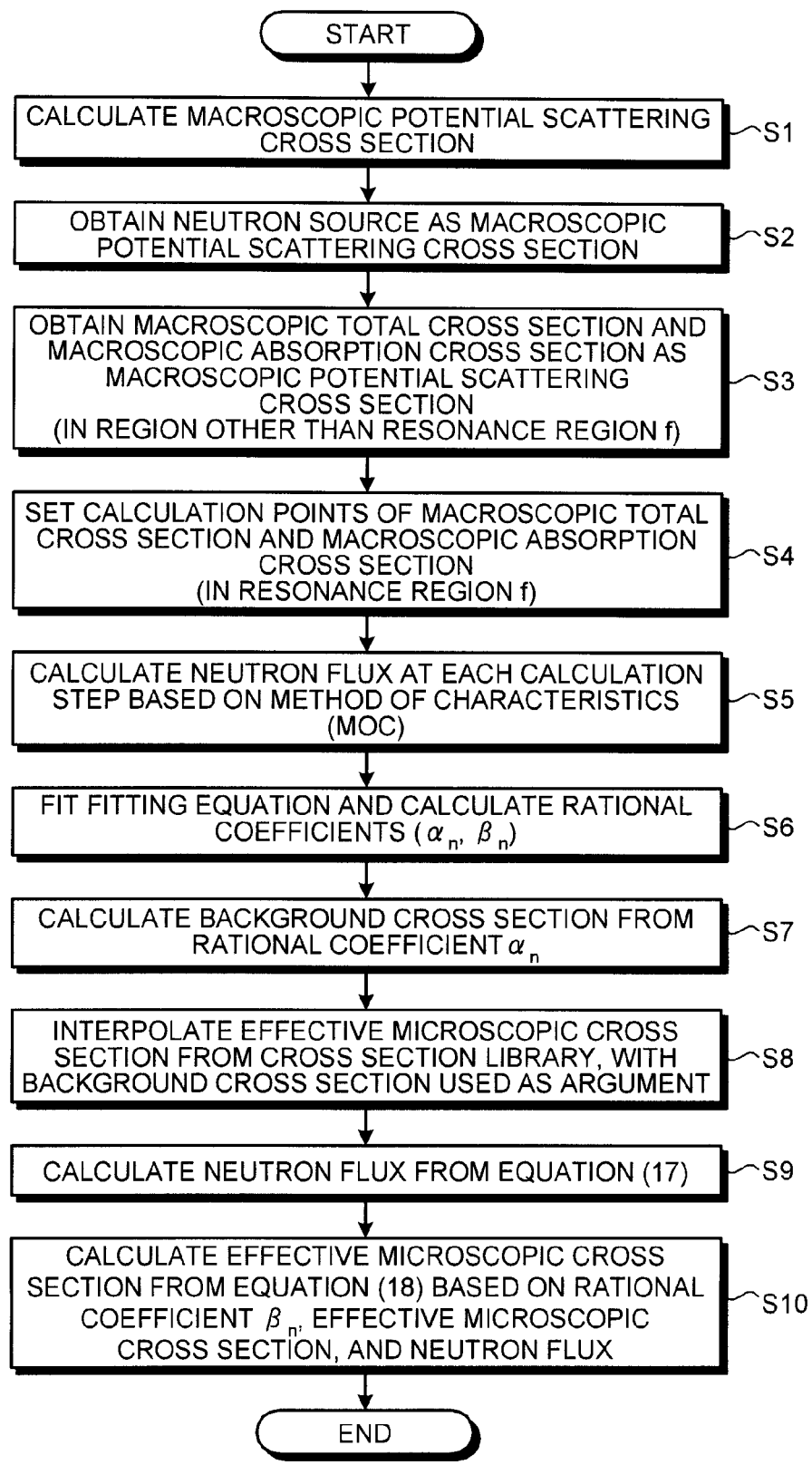
FIG. 6 is a flowchart for calculating an effective microscopic cross section by the resonance calculation program.

With reference to FIG. 6, a flow of the analyzing apparatus 40 for causing the resonance calculation program 51 to calculate the effective microscopic cross section using the above calculation equations is described next. FIG. 6 is a flowchart for calculating the effective microscopic cross section by the resonance calculation program. While the flow is described in a case of calculating the effective microscopic cross section of the resonance nuclide r in the fuel region f, the flow can be applied to a case of calculating the effective microscopic cross section of the resonance nuclide r contained in the cladding tube 11 or a non-fuel matter.

First, the analyzing apparatus 40 calculates the macroscopic potential scattering cross section of each of the detailed regions i in the analysis target region 30 according to the Equation (21) (Step S1).

[Equation 21]

$$\Sigma_p^i = \sum_k \lambda_k N_k^i \sigma_p^k \quad (21)$$

i . . . Detailed region

Next, assuming that a neutron source is subjected to IR approximation, a neutron source intensity S is obtained as the macroscopic potential scattering cross section calculated at Step S1 (Step S2) and expressed by the following Equation (22).

[Equation 22]

$$S_i = \Sigma_p^i \quad (22)$$

$S_i$ . . . Neutron source of detailed region i

Subsequently, assuming that the absorption reaction and resonance scattering are ignorable for the detailed regions i (assumed) not including the resonance regions (the detailed regions i other than the fuel regions f), the macroscopic total cross section is obtained as the macroscopic potential scattering cross section (Step S3) and expressed by the following Equation (23). Furthermore, because the macroscopic scattering cross section is zero in the one-group fixed-source calculation, the macroscopic total cross section is equal to the macroscopic absorption cross section. Therefore, for the detailed regions i that do not include the resonance regions, the macroscopic absorption cross section is also obtained as the macroscopic potential scattering cross section (Step S3) and expressed by the Equation (23).

[Equation 23]

$$\Sigma_t^i = \Sigma_a^i = \Sigma_p^i \quad (23)$$

$\Sigma_a^i$ . . . Macroscopic absorption cross section of detailed region i

Furthermore, the analyzing apparatus 40 sets (2N−1) or more calculation points in the gray range from the white body to the black body in the fuel region f that is the resonance region as the macroscopic total cross section or macroscopic absorption cross section (Step S4: calculation point setting Step).

Upon setting the calculation points, the analyzing apparatus 40 makes the one-group fixed-source calculation based on the MOC to the macroscopic total cross section using the following Equation (24) in the calculation conditions give at Steps S2 to S4, and calculates the neutron flux (Step S5: first neutron flux calculation step). The pair $(\Sigma_{t,f}, \phi_f)$ including the neutron flux and corresponding to the macroscopic total cross section or macroscopic absorption cross section is thereby created.

[Equation 24]

$$\frac{d\phi_f(s)}{ds} + \Sigma_t^f \phi_f(s) = \Sigma_p^f \quad (24)$$

Upon creating the pair $(\Sigma_{t,f}, \phi_f)$, the analyzing apparatus 40 fits the Equation (20) that is the fitting equation, thereby calculating the rational coefficients $\alpha_n$ and $\beta_n$ (Step S6: coefficient calculation step).

After calculating the rational coefficients $\alpha_n$ and $\beta_n$, the analyzing apparatus 40 calculates the background cross section based on the rational coefficient $\alpha_n$ and the given specification data (Step S7: background cross section calculation step). Next, the analyzing apparatus 40 interpolates the effective microscopic cross section from the Equation (7) stored in the cross section library 55 with the calculated background cross section used as the argument. Next, the analyzing apparatus 40 assigns the interpolated effective microscopic cross section, the background cross section, and the microscopic potential cross section of the resonance nuclide r to the Equation (17), thereby calculating the neutron flux (Step S9: second neutron flux calculation step). Based on the rational coefficient $\beta_n$ calculated in Step S6, the effective microscopic cross section calculated in Step S8, and the neutron flux calculated in Step S9, the analyzing apparatus 40 calculates the effective microscopic cross section of the heterogeneous system from the Equation (18) (Step S10: effective cross section calculation step).

Figure 7:
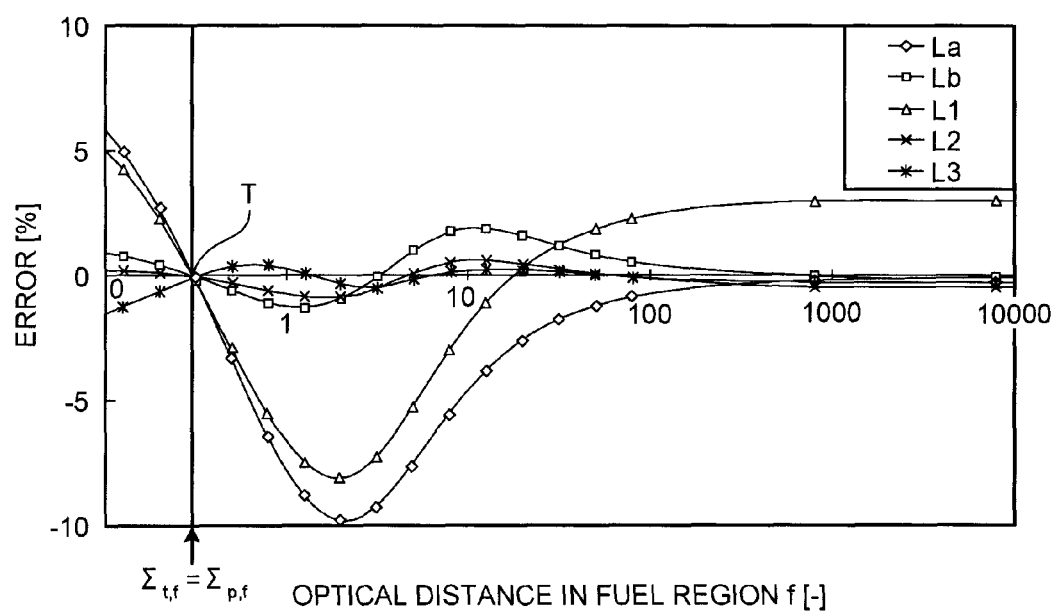
FIG. 7 is a graph of evaluating repeatable precision of a macroscopic total reaction rate calculated using the resonance calculation program.

FIG. 7 is a graph of evaluating repeatable precision of the macroscopic total reaction rate calculated using the resonance calculation program. With reference to FIG. 7, precision of the effective microscopic cross section calculated using the resonance calculation program 51 according to the present embodiment is evaluated. In FIG. 7, a horizontal axis indicates optical distance $\Sigma_{t,f} l_f$ and a vertical axis indicates error on percentage of the macroscopic total reaction rate to a true value thereof. A point T is a point at which the macroscopic total cross section is equal to the macroscopic potential cross section. Furthermore, if an optical distance is shorter, the fuel region f is closer to the white body. If the optical distance is longer, the fuel region f is closer to the black body.

L1 shown in FIG. 7 is a result of the repeatable precision of the macroscopic total reaction rate when the resonance calculation is made if the number of terms N of the Equation (9) that is the equation expressing the neutron escape probability is 1, that is, in a case of N=1. L2 is a result of the repeatable precision of the macroscopic total reaction rate when the resonance calculation is made if the number of terms N of the Equation (9) that is the equation expressing the neutron escape probability is 2, that is, in a case of N=2. L3 is a result of the repeatable precision of the macroscopic total reaction rate when the resonance calculation is made if the number of terms N of the Equation (9) that is the equation expressing the neutron escape probability is 3, that is, in a case of N=3. La is a result of the repeatable precision of the macroscopic total reaction rate when the resonance calculation is made using Wigner's Rational Approximation that is a conventional neutron escape probability equation. Lb is a result of the repeatable precision of the macroscopic total reaction rate when the resonance calculation is made using Stamm'ler's Two-Term Approximation that is a conventional neutron escape probability equation.

Because the Wigner's Rational Approximation and the Stamm'ler's Two-Term Approximation have conventional constitution, they are described briefly. The Wigner's Rational Approximation represents a neutron escape probability by a one-term rational expression assuming that the fuel region f is the black body. The Stamm'ler's two-term rational approximation represents a neutron escape probability by a two-term rational expression assuming that the fuel region f is the black body.

As shown in FIG. 7, La is the approximation of the neutron escape probability to a one-term rational expression and approximation of the fuel region f to the black body. Due to this, error is greater on white body-side of the fuel region f whereas error is smaller on black body-side of the fuel region f. L1 is the approximation of the neutron escape probability to a one-term rational expression similarly to La, in consideration of the gray range from the white body to the black body. Due to this, error is smaller than that of La on white body-side of the fuel region f whereas error is greater than that of La on black body-side of the fuel region f.

Lb is the approximation of the neutron escape probability to a two-term rational expression and the approximation of the fuel region f to the black body. Due to this, error is greater on white body-side of the fuel region f whereas error hardly occurs on black body-side of the fuel region f. L2 is the approximation of the neutron escape probability to a two-term rational expression similarly to Lb, in consideration of the gray range from the white body to the black body. Due to this, error is smaller than that of Lb on white body-side of the fuel region f whereas error hardly occurs on black body-side of the fuel region f.

L3 is the approximation of the neutron escape probability to a three-term rational expression, in consideration of the gray range from the white body to the black body. Due to this, error is the smallest on white body-side of the fuel region f whereas error hardly occurs on black body-side of the fuel region f.

According to the configuration described above, the resonance calculation program 51 according to the present embodiment can consider the neutron escape probability in the gray range from the white body to the black body in the detailed regions i (such as the fuel regions f) where the resonance phenomenon should be considered in the process of calculating the effective microscopic cross section. Moreover, the resonance calculation program 51 can strictly evaluate the two-dimensional geographical analysis target region 30 using the MOC in the process of calculating the effective microscopic cross section. Due to this, the resonance calculation program 51 can precisely calculate the effective macroscopic cross section calculated by the resonance calculation. Accordingly, calculation precision in the transport calculation program making calculation using the effective macroscopic cross section and that in the reactor core calculation code can be improved.

INDUSTRIAL APPLICABILITY

As described so far, the resonance calculation program and analyzing apparatus according to the present invention are effective for the nuclear-constant calculation codes for evaluating nuclear characteristics in the reactor core and particularly suited for a case of calculating the effective cross section of the detailed region where the resonance phenomenon occurs.

| [Reference Signs List] | |
|---|---|
| 5 | reactor core |
| 6 | fuel assembly |
| 10 | fuel rod |
| 11 | cladding tube |
| 12 | inter-assembly gap |
| 13 | moderator |
| 14 | control rod |
| 15 | in-core nuclear instrumentation |
| 20 | cell |
| 30 | analysis target region |
| 40 | analyzing apparatus |
| 41 | storage unit |
| 50 | nuclear-constant calculation code |
| 51 | resonance calculation program |
| 52 | transport calculation program |
| 53 | burn-up calculation program |
| 54 | nuclear-constant calculation program |
| 55 | cross section library |
| i | detailed region |
| f | fuel region |

The invention claimed is:

1. A non-transitory computer-readable storage medium storing a resonance calculation program, wherein the resonance calculation program configured to instruct a computer to execute a resonance calculation of calculating an effective cross section serving as an input value for neutron transport calculation on hardware at a time of calculating a neutron flux in a fuel assembly storing a fuel rod, wherein a cross section of the fuel assembly taken along an orthogonal plane orthogonal to an axial direction of the fuel rod is defined as an analysis target region in the resonance calculation, the analysis target region being divided into a plurality of detailed regions, a part of the detailed regions being a resonance region where a resonance phenomenon occurs, a neutron escape probability in the resonance region is expressed by a polynomial rational expression representing a gray range from a black body in which the resonance region absorbs all of neutrons to a white body in which the resonance region does not absorb all of the neutrons at all, the polynomial rational expression including a first rational coefficient and a second rational coefficient, the resonance calculation program uses:
a fitting equation for calculating the first rational coefficient and the second rational coefficient, with the first rational coefficient and the second rational coefficient used as factors;
a first calculation equation for calculating a background cross section for calculating the effective cross section, with the first rational coefficient used as a factor;
a second calculation equation for calculating the neutron flux, with the background cross section used as a factor; and
a third calculation equation for calculating the effective cross section, with the second rational coefficient and the neutron flux obtained by the second calculation equation used as factors, and wherein
the resonance calculation program instructs the computer to perform the following steps:
a calculation point setting step of setting a macroscopic cross section in the gray range, to the resonance region as a calculation point;
a first neutron flux calculation step of calculating the neutron flux set at the calculation point and corresponding to the macroscopic cross section based on Method of Characteristics;
a coefficient calculation step of fitting the fitting equation to the macroscopic cross section and the neutron flux so as to provide a function representing the macroscopic cross section and the neutron flux at the calculation point, and calculating the first rational coefficient and the second rational coefficient;
a background cross section calculation step of assigning the calculated first rational coefficient to the first calculation expression, and calculating the background cross section;
an effective cross section interpolation step of interpolating the effective cross section from a cross section storage unit storing the effective cross section made to correspond to the background cross section, with the calculated background cross section used as an argument;
a second neutron flux calculation step of assigning the background cross section to the second calculation equation, and calculating the neutron flux; and
an effective cross section calculation step of assigning the effective cross section obtained at the effective cross section interpolation step, the neutron flux obtained at the second neutron flux calculation step, and the second rational coefficient obtained at the coefficient calculation step to the third calculation equation, and calculating the effective cross section.

2. The non-transitory computer-readable storage medium storing the resonance calculation program of claim 1, wherein
a neutron escape probability in the resonance region is expressed by following calculation equation (1):

[Equation 1]

$$P_{f \to m}(E) = \sum_{n=1}^{N} \beta_n \frac{\alpha_n}{\Sigma_t^f(E) l_f + \alpha_n} \quad (1)$$

$P_{f \to m}(E)$ ... Neutron escape probability
E ... Neutron energy
N ... Number of term
$\alpha_n$ ... First rational coefficient
$\beta_n$ ... Second rational coefficient $\Sigma_t^f$ ... Macroscopic total cross section in a resonance region f
$l_f$ ... Average chord length in the resonance region f;
the fitting equation is expressed by following calculation equation (2):

[Equation 2]

$$\phi_f(\Sigma_t^f) = \sum_{n=1}^{N-1} \beta_n \frac{\Sigma_p^f l_f + \alpha_n}{\Sigma_t^f l_f + \alpha_n} + \left(1 - \sum_{n=1}^{N-1} \beta_n \right) \cdot \frac{\Sigma_p^f l_f + \alpha_N}{\Sigma_t^f l_f + \alpha_N} \quad (2)$$

$\phi_f$ ... Neutron flux in the resonance region f
$\Sigma_p^f$ ... Macroscopic potential scattering cross section in the resonance region f;
the first calculation equation is expressed by following calculation equation (3):

[Equation 3]

$$\sigma_0^{nr} = \frac{\sum_{k \neq r} \lambda_k N_k^f \sigma_p^k + \alpha_n / l_f}{N_r^f} \quad (3)$$

$\sigma_0^{nr}$ ... Background cross section of a resonance nuclide r at an n-th term
$\lambda_k$ ... IR parameter of the nuclide k
$N_k^f$ ... Atomic number density of a nuclide k in the resonance region f
$N_r^f$ ... Atomic number density of the resonance nuclide r in the resonance region f
$\sigma_p^k$ ... Microscopic potential scattering cross section of the nuclide k;
the second calculation equation is expressed by following calculation equation (4):

[Equation 4]

$$\varphi_g^r(\sigma_0^{nr}) = \frac{\sigma_p^r + \sigma_0^{nr}}{\sigma_{a,g}^r(\sigma_0^{nr}) + \sigma_p^r + \sigma_0^{nr}} \quad (4)$$

$\phi_g^r$ ... Neutron flux of the resonance nuclide r in a group g
$\sigma_p^r$ ... Microscopic potential scattering cross section of the resonance nuclide r $\sigma_{a,g}^r$ ... Microscopic absorption cross section of the resonance nuclide r in the group g; and
the third calculation equation is expressed by following calculation equation (5):

[Equation 5]

$$\sigma_{x,g}^{r,f} = \frac{\sum_{n=1}^{N} \beta_n \sigma_{x,g}(\sigma_0^{nr}) \varphi_g^r(\sigma_0^{nr})}{\sum_{n=1}^{N} \beta_n \varphi_g^r(\sigma_0^{nr})} \quad (5)$$

$\sigma_{x,g}^r$ ... Effective microscopic cross section of the resonance nuclide r in the group g for reaction x
$\sigma_{x,g}^{r,f}$ ... Effective microscopic cross section of the resonance nuclide r in the group g for the reaction x in the resonance region f.

3. The non-transitory computer-readable storage medium storing the resonance calculation program of claim 2, wherein at the calculation point setting step, number of calculation points is set to equal to or greater than 2N−1.

* * * * *